(12) United States Patent
Stacey et al.

(10) Patent No.: US 6,654,376 B1
(45) Date of Patent: Nov. 25, 2003

(54) ATM PACKET SCHEDULER

(75) Inventors: Dave Stacey, Stansted Abbotts (GB); Fai Tsang, South Woodham Ferrers (GB); Simon Brueckheimer, London (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/473,724

(22) Filed: Dec. 28, 1999

(51) Int. Cl.[7] .............................................. H04L 12/28
(52) U.S. Cl. ................................................ 370/395.21
(58) Field of Search ....................... 370/395.2, 395.21, 370/395.6, 395.61, 395.64; 710/29

(56) References Cited

U.S. PATENT DOCUMENTS

| | | | | |
|---|---|---|---|---|
| 5,513,178 A | * | 4/1996 | Tanaka ..................... | 370/395.3 |
| 5,802,051 A | * | 9/1998 | Petersen et al. ........ | 370/395.42 |
| 5,987,031 A | * | 11/1999 | Miller et al. ................ | 370/412 |
| 6,041,054 A | * | 3/2000 | Westberg ..................... | 370/389 |
| 6,061,354 A | * | 5/2000 | Morikawa et al. ....... | 370/395.7 |
| 6,167,049 A | * | 12/2000 | Pei et al. ............... | 370/395.43 |
| 6,195,353 B1 | * | 2/2001 | Westberg .................. | 370/230.1 |
| 6,434,154 B1 | * | 8/2002 | Stacey et al. .......... | 370/395.64 |
| 6,449,276 B1 | * | 9/2002 | Subbiah et al. .......... | 370/395.6 |

FOREIGN PATENT DOCUMENTS

EP    1014745 A1  *  6/2000  ........... H04Q/11/04

* cited by examiner

Primary Examiner—Hassan Kizou
Assistant Examiner—D Levitan
(74) Attorney, Agent, or Firm—Barnes & Thornburg

(57) ABSTRACT

A packet scheduler controls dispatch of packets containing constant bit rate (CBR) or real time variable bit rate (rt-VBR) at an ingress operation of multiplexing the packets into payloads of an asynchronous transfer mode (ATM) bearer virtual circuit connection. Packets can be queued in one of a number of queues according to priority. The scheduler controls assembly of common part sublayer payload data units (CPS-PDU) comprising any unused octets from a previous packet partially dispatched, and whole packets in order of priority. If a holdover timer period expires before a common part sublayer payload data unit is completed, the payload of that data unit is packed with null data; and dispatched. The packet dispatch is controlled so as to match the traffic characteristics of an underlying bearer channel.

10 Claims, 5 Drawing Sheets

Multiplex of AAL2 Minicells into ATM Payloads

Multiplex of AAL2 Minicells into ATM Payloads

ATM PACKET SCHEDULER

FIELD OF THE INVENTION

This invention relates to arrangement and method of adapting voice and data traffic into an ATM network.

BACKGROUND OF THE INVENTION

The services that are carried in today's telecommunications network can be categorised into two main types; real time and non-real time services. The key examples of these two types are respectively voice telephony and computer data. The two services have very different characteristics and requirements and therefore have traditionally been carried over disjoint network technologies. However to increase flexibility and to decrease costs, there is a major drive by Post Telephone and Telegraph Administrations (PTTs) and network operators to integrate real-time and non-real time services within one homogeneous network. The asynchronous transfer mode (ATM) has been specifically designed to enable this.

A component of ATM is the adaptation function. This provides the mechanism that adapts the carried service to and from the ATM domain. Several adaptation layers have so far been defined. For example, ATM Adaptation Layer 1 (AAL1) is designed to adapt constant bit rate services (predominately voice or video) into fixed length ATM cells. A key feature of AAL1 is that it enables the timing relationship between the transmitter and receiver to be maintained over the asynchronous network. In contrast, AAL5 has been predominantly designed to support data services. As such it provides a mechanism to segment long data packets into fixed length ATM cells and a mechanism to enable the integrity of the reassembled data packet to be validated after transmission across the network. AAL5 is also being used in certain applications to carry voice services (particularly in computer desktop applications) where AAL5 technology is readily available.

Both AAL1 and AAL5 adapt the carried service into a stream of fixed length ATM cell payloads. However for certain compressed voice services the length of the ATM cell payload (48 bytes) is too large and its use would lead to a large packetisation delay that in turn would affect existing network delay budgets and acceptable voice characteristics. To resolve this problem AAL2 has been defined. AAL2 supports a multiplex of user channels within a single Virtual Channel Connection (VCC). Each user channel is carried in a stream of 'mini-packets'—the length of the mini-packet payload for each channel can be defined according to the packetisation delay that can be tolerated. AAL2 differs from AAL1 and AAL5 in two key ways; firstly it enables a single VCC to support multiple diverse services (a number of simultaneous voice, video and data channels can be multiplexed together to reduce packetisation delay), and secondly it introduces a new switching layer above the ATM layer (i.e. the function of switching a mini-packet connection from one AAL2 VCC to another AAL2 VCC).

AAL2 has introduced a number of new issues to ATM scheduling and congestion control. These arise primarily from the characteristics of the traffic sources that AAL2 has been designed to support.

Traffic Classes Overview
ATM Traffic Classes

To accommodate the differing behaviours and QoS requirements for a variety of traffic sources, a set of traffic classes is defined in ATM. Each class is designed to describe the characteristics and requirements of a particular type of voice or data service. Five traffic classes have been defined by the ATM Forum [ATMF TM4]—Constant Bit Rate (CBR), Real Time Variable Bit Rate (rt-VBR), Non real time Variable Bit Rate (nrt-VBR), Available Bit Rate (ABR) and Undefined Bit Rate (UBR).

However by its nature only the CBR and rt-VBR classes are appropriate for AAL2.

CBR

The CBR traffic class has been designed to support periodic traffic sources that have real-time requirements (i.e. they are delay sensitive). The traffic contract for a CBR connection is entirely specified by its Peak Cell Rate (PCR). The PCR specifies the peak emission rate of ATM cells (and thus implicitly the period between successive cells). All cells within the connection should conform to the PCR. Although the connection is described as CBR, it is perfectly admissible to transmit cells at lower than the PCR, or even to halt emission entirely.

Since the class is real-time, the ATM network commits to delivering cells within a specified delay and jitter bound (CTD and CDV).

rt-VBR

The real-time VBR class has been defined to support variable rate real time services (such as certain video streams). A rt-VBR connection is specified in terms of its Sustained Cell Rate (SCR), its Maximum Burst Size (MBS) and its PCR. The SCR defines the mean rate of the connection, the PCR defines the peak rate of any burst and the MBS defines the relationship between the two. Again, as this is a real time connection, the ATM network commits to delivering the service to specified delay and jitter bounds.

Policing of Connections

Once a connection has been established the ATM network commits to delivering it within the pre-specified QoS bounds providing the connection adheres to its traffic contract. The connection will be policed by the network at certain key interface points (typically the UNI and any inter-operator NNIs)—any cells that do not comply with the contract can be either discarded or tagged.

The Generic Cell Rate Algorithm (GCRA) (commonly known as a leaky bucket algorithm) has been defined to perform the policing function in ATM. The GCRA is generically specified through the use of two parameters—the Increment (INC) and Limit. The Increment specifies the anticipated period between conforming cells whilst the Limit specifies the allowed 'relaxation' from this increment for cells that arrive earlier than anticipated.

For a CBR connection the Increment is simply the reciprocal of the PCR. Due to the statistical effects of multiplexing sources together, jitter is introduced into a connection at all stages in the network (including at source as seen by the UNI). The allowable jitter, at each policed interface (e.g. a UNI or NNI), is termed the Cell Delay Variation Tolerance (CDVT). It is this parameter that is used for the GCRA Limit value in a CBR connection.

The generic GCRA algorithm can be summarised by the following pseudo-code:

```
if (cell_arrive_time > TAT)            /* TAT is Theoretical Arrival Time */
{
    cell_conforms;
    TAT = cell_arrival_time + INC,
}
else if (cell_arrival_time > TAT - Limit)
{
    cell_conformant;
    TAT = TAT + INC;
}
else
    cell_non_conformant;
```

Thus for a CBR connection the minimum interval between successive cells is equal to 1/PCR−CDVT. Any cells outside of this, can be marked as non-conformant and subsequently discarded if desired.

A rt-VBR connection on the other-hand must conform to both the PCR and SCR components of its traffic contract. To police this, two GCRAs operating in parallel are used to ensure compliance (each cell must comply to both GCRAs for the cell to be conformant). The first GCRA polices the peak rate of the connection (thus Increment=1/PCR, Limit= CDVT) whilst the second polices for the sustained rate. The sustained rate GCRA rate algorithm is defined by the parameters (Increment=1/SCR and Limit=BT+CDVT) where BT is the Burst Tolerance of the connection and is calculated by:

$$BT=(MBS-1)(1/SCR-1/PCR)$$

AAL2 will be used primarily to support CBR Voice and VBR Voice traffic sources (although it can also support other delay sensitive traffic as well as data). It is important to note here the distinction between the individual AAL2 traffic sources and the underlying traffic class of the VCC bearer (CBR or rt-VBR VCC). In AAL2 it will be quite normal to use a CBR VCC to aggregate together a number of VBR Voice traffic sources or to use a rt-VBR VCC to support a mixture of CBR Voice and VBR Voice traffic sources.

A CBR Voice source is characterised by a periodic emission of constant rate data. CBR Voice sources include traditional 64 kb/s PCM (as typically carried by AAL1) or may arise through the use of constant rate CODECs with no silence suppression or down-speeding facility. CBR Voice sources are well understood and when multiple sources are multiplexed into a single VCC the aggregate will form a well-behaved CBR VCC connection (in an analogous manner to how CBR VCCs can be multiplexed together to form a CBR VPC). Congestion can therefore be prevented primarily through the use of appropriate Connection Admission Control (CAC) procedures.

VBR Voice is the term used to describe a traffic source generated by the use of a variable rate coding scheme and/or the utilisation of silence suppression. Generally, such sources still generate data at fixed periodic intervals, however now at each interval, the amount of data generated (the AAL2 packet payload length) can vary dynamically from packet to packet (down to zero during silent intervals). Such a voice source can therefore be characterised as an on-off source that has a variable bit rate during its on-period (albeit constrained to a small set of pre-defined CODEC rates) and an on-off distribution that is defined by the user's talkspurt behaviour. Unfortunately the multiplex of these sources no longer guarantees that the aggregate VCC obeys a well behaved CBR characteristic.

Assuming a nominal 50:50 talkspurt ratio each user spends approximately half their time in speech and the other half in silence. Therefore the mean occupancy on any bearer VCC will be half of that if silence suppression was not performed. However over any short time interval there is also a finite probability that fewer or greater than half the users will be active. These statistical fluctuations about the mean increase inversely with the number of users in the VCC pool. Therefore if the underlying bearer VCC is CBR with a capacity equating to the aggregate mean rate of the users, during periods where greater than half the users are active congestion will occur at the AAL2 multiplexing layer. Further due to the talkspurt characteristics, the duration of this congestion will typically be far longer than the normal cell-scale congestion that occurs naturally even when multiplexing pure CBR sources together. Simulations have shown that talkspurt congestion periods of several tens of milliseconds can arise when multiplexing multiple VBR Voice sources together over a low rate CBR VCC bearer connection.

There are a number of mechanisms to compensate for this potential talkspurt congestion. These include:

Use of a very rigorous CAC mechanism to minimise the probability of talkspurt congestion occurring. However for a VCC multiplexing together a low number of sources this is likely to lead to a poor statistical multiplexing gain (poor loading utilisation on the link).

Minimise talkspurt activity by traffic engineering. As the community of users increases the effects of talkspurt activity diminishes (the statistical fluctuation from the mean is smaller for larger groups of users). Thus by maximising the number of sources in a VCC or by aggregating multiple VCCs into a VPC (and policing at the VPC level not the VCC level) the potential for congestion due to talkspurt activity is minimised.

Accept that congestion will occur and provide sufficiently large buffers (at both source and sink) to compensate for it.

Dynamically down-speed connections during periods of talkspurt congestion. Some (but not all CODECS) can dynamically vary the connection bit-rate between a number of defined rates. (For example an Adaptive Differential Pulse Code Modulation (ADPCM) connection might select between 32 and 16 kb/s).

Use a rt-VBR traffic contract to enable the VCC cell rate to vary its bandwidth to cater for fluctuations in the aggregate bit rate of the traffic sources.

Minimise congestion by delaying lower priority traffic (i.e. delay insensitive) in favour of voice traffic during periods of high talk activity.

In practice due to the sheer diversity of network applications for which AAL2 is likely to be used a combination of all of these methods may be employed (although obviously not at the same time on a single VCC). This places some general requirements on an AAL2 packet scheduler process which may be summarised as:

It should provide sufficient buffering to absorb talkspurt congestion.

It should have the ability to monitor for the onset of congestion at source either at the individual VCC level or at the device level as a whole. Detection of such congestion mechanisms should where possible enable alarms to be generated that can subsequently be applied to the traffic generating CODECS to indicate that they should apply down-speeding (if possible).

It must have the ability to generate AAL2 VCC connections having either a CBR or a rt-VBR traffic profile.

To minimise the the delay for real time services in favour of non-real time services AAL2 packet level prioritisation should be supported.

The permissible emission rate of cells for an ATM VCC is governed by its traffic contract. For a CBR VCC this contract is specified in terms of a Peak Cell Rate (PCR). For a rt-VBR VCC the emission of cells must comply with its PCR, as well as its Sustained Cell Rate (SCR) and Maximum Burst Size (MBS). In the context of an AAL2 packet scheduler compliance to the specified bearer VCC traffic contract may be achieved by explicit enforcement, implicitly or a mixture of both.

With explicit conformance the AAL2 packet scheduler explicitly shapes its traffic to ensure compliance with the underlying bearer VCC traffic contract. Thus if the instantaneous packet rate (arriving at the scheduler) is greater than the contracted bearer rate then the scheduling of completed ATM cell payloads still remains in contract and the excess packets will be buffered within the packet scheduler buffer area.

In contrast, where implicit conformance is employed, the packet scheduler takes no account of the underlying bearer traffic contract—it is simply event driven by the arrival of new AAL2 packets. In this scenario the packet scheduler is effectively anticipating that the arrival of packets in itself will implicitly conform to the underling traffic contract. In effect this approach is relying on the CAC procedures being sufficiently stringent such that the probability of the contract being broken without explicit conformance is very low. Effectively the established traffic contract has been defined such that even under the 'worst-case' packet arrival scenarios rate the instantaneous arrival rate is still within the bounds of the contract and thus no further timing controls are required by the packet scheduler. However due to the nature of talkspurt behaviour it is unlikely that for the majority of cases this implicit timing approach will yield an efficient solution since (especially for low rate CBR VCCs) the contracted PCR would tend to need to greatly exceed the nominal sustained rate of the connection (due to statistical fluctuations)—in effect this would lead to a very low utilisation of the available bandwidth. (One other option when using implicit timing controls within the packet scheduler is to use a subsequent ATM device to reshape the emitted traffic to the underlying traffic contract.)

Alternatively a hybrid timing approach can also be used within the packet scheduler. In this scenario explicit timing is used to ensure compliance to the PCR only. Whilst this is sufficient in itself for CBR VCCs for rt-VBR VCCs compliance to the SCR and MBS is not enforced. Instead in the hybrid approach the traffic contract is established such that providing the PCR is complied to the arrival of packets will not cause the SCR or MBS to be exceeded (in effect SCR and MBS are instead implicitly enforced by defining appropriate limits at connection setup.

The introduction of AAL2 has introduced a number of new issues relating to ATM scheduling and congestion control, and in particular the problem of efficient bandwidth utilisation. These arise primarily from the nature of the traffic sources, particularly voice, which AAL2 has been designed to support.

SUMMARY OF THE INVENTION

An object of the invention is to provide an improved method and apparatus for ATM packet scheduling.

According to a first aspect of the invention, there is provided a method of scheduling dispatch of packets containing constant bit rate (CBR) or real time variable bit rate (rt-VBR) at an ingress operation of multiplexing the packets into payloads of an asynchronous transfer mode (ATM) bearer virtual circuit connection, the method comprising controlling the packet dispatch so as to match the traffic characteristics of an underlying bearer channel.

According to another aspect of the invention, there is provided method of scheduling dispatch of packets containing constant bit rate (CBR) or real time variable bit rate (rt-VBR) at an ingress operation of multiplexing the packets into payloads of an asynchronous transfer mode (ATM) bearer virtual circuit connection, the method comprising;

enabling a holdover timer having a pre-set period on receipt of a packet; assembling common par t sublayer payload data unit (CPS-PDU) comprising any unused octets from a previous packet partially dispatched, and whole packets in order of priority;

whenever said timer period expires before a said common part sublayer payload data unit is completed, packing the payload of that data unit with null data; and controlling the packet dispatch so as to match the traffic characteristics of an underlying bearer channel.

According to a further aspect of the invention, there is provided packet scheduler for dispatch of packets containing constant bit rate (CBR) or real time variable bit rate (rt-VBR) at an ingress operation of multiplexing the packets into payloads of an asynchronous transfer mode (ATM) bearer virtual circuit connection, the scheduler comprising;

a holdover timer having a pre-set period on receipt of a packet;

assembly means for assembling common part sublayer payload data unit (CPS-PDU) comprising any unused octets from a previous packet partially dispatched, and whole packets in order of priority and, whenever said timer period expires before a said common part sublayer payload data unit is completed, for packing the payload of that data unit with null data; and means for controlling the packet dispatch so as to match the traffic characteristics of an underlying bearer channel.

The arrangement and method are optimised for AAL2 CBR and rt-VBR traffic. In particular, they offer optimum support for multiple priorities and provide well behaved traffic sources.

BRIEF DESCRIPTION OF THE DRAWINGS

A preferred embodiment of the invention will now be described with reference to the accompanying drawings in which.

DETAILED DESCRIPTION OF PREFERRED EMBODIMENTS

Figure 1:
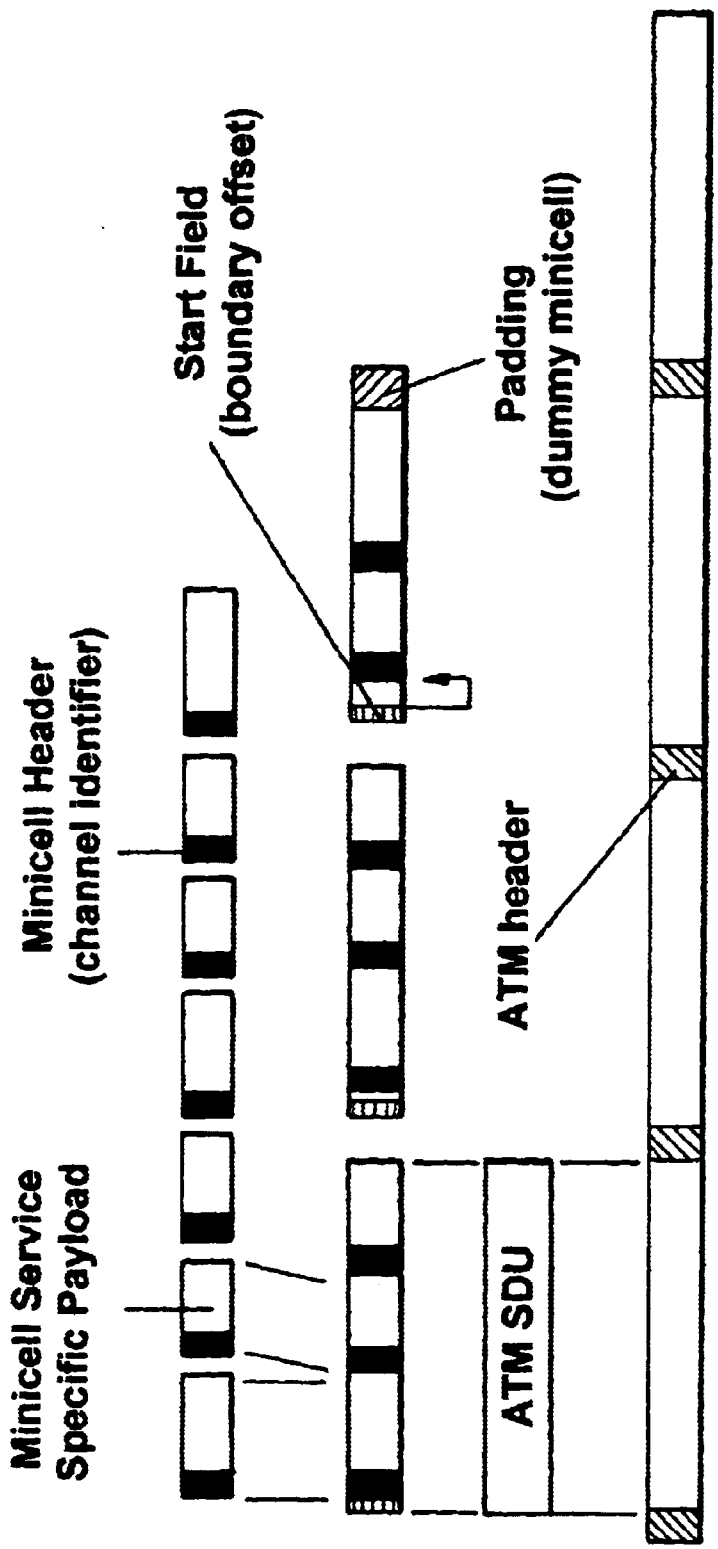
FIG. 1 illustrates the multiplexing of AAL2 minicells into ATM payloads.

Referring first to FIG. 1, which is introduced for explanatory and comparative purposes, this illustrates The multiplex of AAL2 mini-packets into ATM cell payloads is illustrated in FIG. 1. By multiplexing multiple sources into the bearer payload, the cell assembly delay incurred is minimised compared to traditional ATM adaptation mechanisms whereby one VCC supports a single user only. Clearly, as the number of simultaneous users of the bearer VCC decreases the cell assembly delay will tend to increase. Therefore the AAL2 adaptation standard specifies a timer called the holdover timer that provides a bound for this delay under these conditions. Configurable on a per VCC basis, the holdover timer is reset at the start of each cell payload assembly process (i.e. the first octets of any AAL2 packet placed into the cell payload cause the timer to reset and the timing process to begin). If the timer expires prior to the complete assembly of a payload then at the point of expiry the partially filed payload is immediately dispatched. The general process of AAL2 segmentation and multiplexing will be familiar to those skilled in the art.

There now follows a description of exemplary embodiments of the invention. The description is in two parts: firstly algorithms are specified that define the idealised packet scheduler operation for a number of different traffic scenarios, secondly a specific implementation of one aspect of the invention is provided.

The algorithms are based on extended versions of the standard GCRA algorithm. The algorithms are optimised such that the resultant traffic sources will behave exactly as defined by their traffic contracts and thus always pass any resultant policing function.

Figure 2:
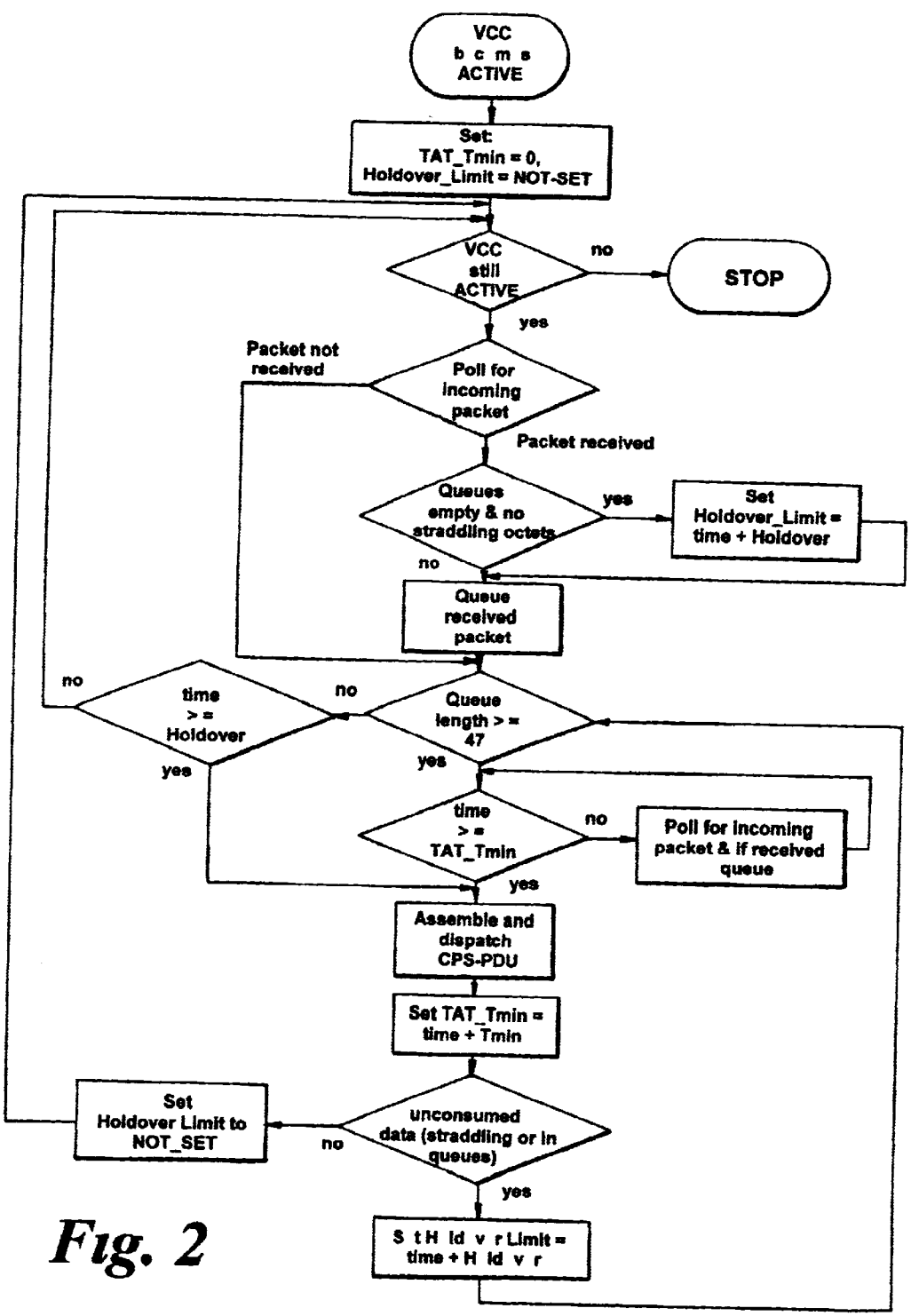
FIG. 2 is a flow chart illustrating a preferred scheduling algorithm.

A preferred packet scheduling algorithm is illustrated in the flow chart of FIG. 2. This algorithm is suitable for scheduling AAL2 packets up to a maximum rate equal to the PCR. Since the algorithm explicitly enforces to the PCR only, then the algorithm is suitable for scheduling to either a CBR traffic contract or a rt-VBR traffic contract (providing the SCR and MBS are implicitly conformed to via the CAC algorithm as previously discussed).

Prior to use the algorithm is configured using two parameters: the minimum inter-cell period Tmin (where Tmin=1/PCR) and the Holdover timer value, where the Holdover timer value is greater than or equal to Tmin). If a value of zero is programmed for Tmin then the packet scheduler is free to emit payloads whenever they have been completed irrespective of the inter-cell duration (i.e. the Tmin timer is always maintained in an expired state). Additionally and/or alternatively a null value for the holdover value may be specified: this indicates that the packet scheduler should emit only completed (full) ATM SDUs irrespective of cell assembly delay (i.e. the Holdover Timer is always maintained in the expired state).

The algorithm is initialised when the VCC becomes active. In normal operation it is designed to schedule either completed ATM cell payloads (either at, or after, the Tmin timer expiry) unless the Holdover timer also expires at which instance a partially assembled cell will be emitted forcibly (any unused payload of the ATM cell is padded with the standard AAL2 pad byte as per the standard).

Packet Level Priority

The algorithm may be used in applications whereby all received packets are assumed to be of equal priority and in this scenario, packets are scheduled strictly in accordance to their arrival (i.e. first come first served). Alternatively the algorithm may be extended to support any number of levels of packet priority and in this scenario the scheduling of a packet is a function of its arrival order, its priority class and the priority scheduling scheme implemented.

The algorithm may be used to schedule to any priority mechanism including strict sense priority (high priority packets are always scheduled before lower priority packets), weighted fair queuing (where each priority class gets equal access to the scheduler albeit in direct proportion to its mean data rate) or statistical priority (whereby one queue is generally prioritised over another albeit the lower priority queue is still granted the scheduler in preference to the higher priority queue according to a user configured statistical priority). Irrespective of priority mechanism the following rules for the scheduling of packets and thus the assembly/dispatch of ATM SDUs are implemented:

The arrival of any packet irrespective of priority is used to initiate the holdover timer (if not already set).

When scheduling a CPS-PDU it is assembled in the following order:

First any unused octets from a packet already partially sent in the previous CPS-PDU are used. Throughout this document we refer to the unconsumed octets of such a straddling packed as the straddling or straddled octets.

Next whole packets are scheduled according to the priority mechanism implemented. For example with strict sense priority packets from the highest priority queue are consumed before the next highest and so on.

Finally any unused payload is padded with null data to complete the CPS PDU.

The detailed operation of the algorithm is described by the use of following pseudo code and is illustrated by the flow chart of FIG. 2.

Pseudo Code

```
packet_scheduler(Tmin, Holdover)
{
    TAT_Tmin = 0;   /* TAT is Theoretical Arrival Time */
    Holdover_Limit = NOT_SET;
    repeat while VCC Connection is ACTIVE
    {
        do
        {
            poll for packet arrival;
            if packet received
```

```
                {
                    if (octets_in_queues + straddling_octets = 0)
                        Holdover_Limit = current_time + Holdover;
                            queue packet;
                }
            }
            while ( (straddling_octets + octets_in_queues < 47 OR time < TAT-Tmin)
AND
                (time < Holdover_Limit) );
            assemble and dispatch CPS-PDU
            TAT_Tmin = time + Tmin;
            if (straddling_octets + octets_in_queues < > 0)
                HoldoverLimit = time + Holdover
        /* reset if the last packet straddled the cell */
            else
                HoldoverLimit = NOT-SET;
    } /* end repeat while
}
```

Figure 3:
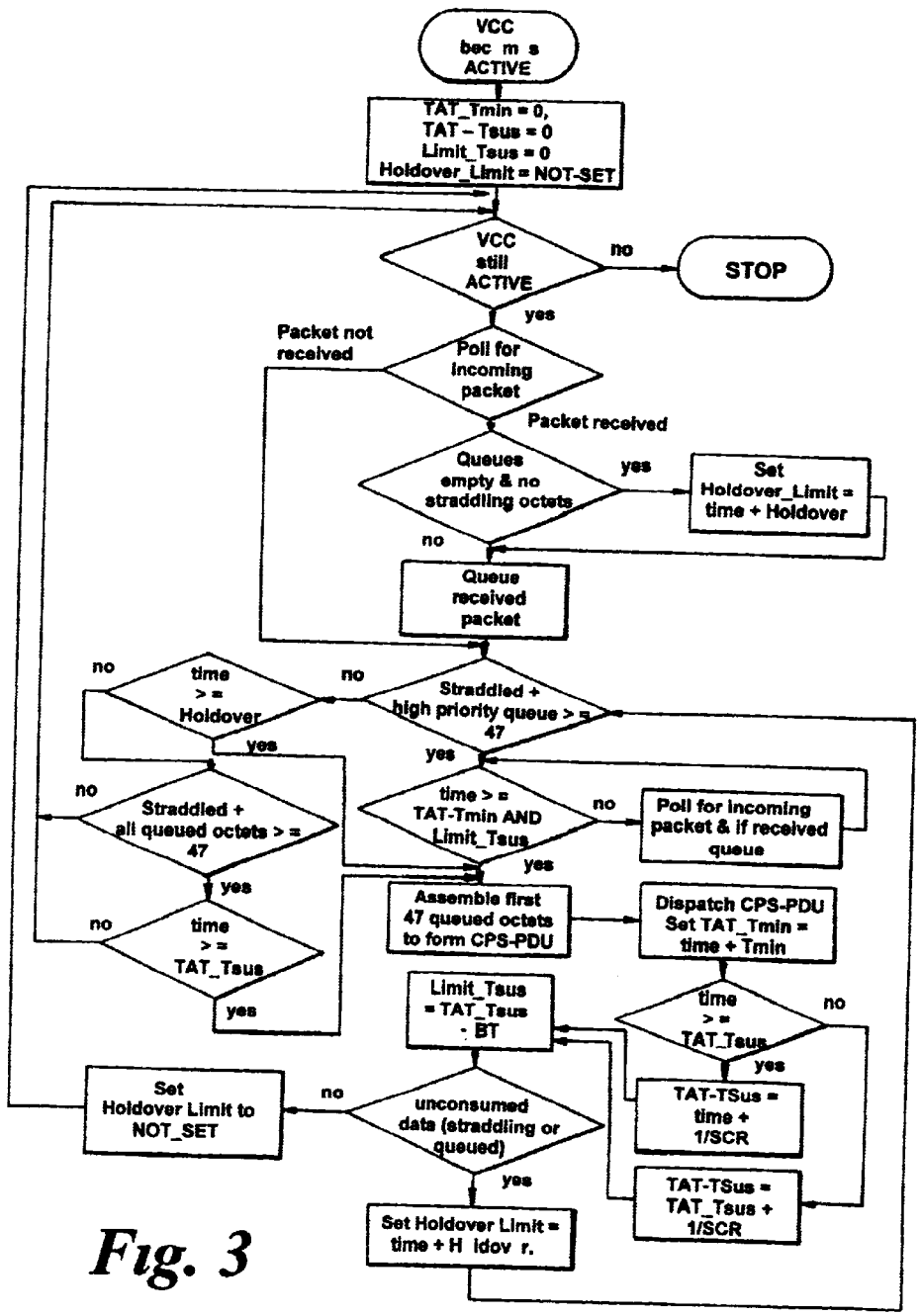
FIG. 3 is a flow chart illustrating a modified scheduling algorithm.

An alternative algorithm is illustrated in flow chart form in FIG. 3.

In this algorithm the packet scheduler is extended to explicitly enforce compliance to the SCR and the MBS as well as the PCR. Each VCC is initialised with 4 parameters Tmin, the Holdover value the sustained inter-cell period Tsus (where Tsus=1/SCR) and the BT (which acts as the limit of the SCR component of the policing function as previously described). Note that Tmin<=Tsus<=Holdover.

The scheduler emits completed cells providing the inter-cell period is compliant to both the PCR and the SCR limits. Only completed payloads are dispatched unless the holdover timer expires in which case a partially completed cell will be emitted. Null values may be configured for the Holdover. Additionally or alternatively a null value may be specified for the SCR components of the VCC (Tsus and BT) in which case the scheduler defaults back to a PCR scheduler only and finally a null values may be specified for the SCR values and the PCR values and the scheduler becomes event driven as before. (Note a null value for the PCR and a non-null value for the Tsus/BT is a non allowed condition).

Packet Priority

Again the algorithm of FIG. 3 can be used either to support a single priority level or multiple levels. The exact implementation can be tailored to the priority mechanism employed. In this example two levels of priority are defined—high and low. Strict sense priority is used between the levels and the following rules are obeyed:

Strict sense priority is used—a low priority packet is never scheduled if there are any high priority packets in the queue.

As soon as the number of octets in the high priority queue (plus any straddled octets irrespective of their priority exceeds 47 a cell may be dispatched providing it complies to both the PCR and the Limit of the SCR.

After expiry of the SCR sustained rate timer, low priority packets are also used to complete the payload. i.e. low priority packets never contribute to a burst.

If the holdover expires then the cell will be dispatched with padding.

Both low and high priority packets are used to initiate the holdover timer.

Tmin<=Tsus<=Holdover

Although the a two level strict sense priority paradigm is illustrated in the following pseudo code and the flow chart of FIG. 3 those skilled in the art will recognise that the algorithm may be readily extended to support further levels or priority and/or a differing priority scheme.

The pseudo code for the algorithm of FIG. 3 is given below.

Pseudo Code

```
packet_scheduler(Tmin, Tsus, Holdover, BT)    /* BT = (MBS-1)(1/SCR - 1/PCR) */
{
    TAT_Tmin = 0;
    TAT_Tsus = 0;      /* Sustained rate of the SCR timer
    Limit_Tsus = 0;    /* Limit of the SCR element of the traffic contract
    Holdover_Limit = NOT_SET;
    repeat while VCC Connection is Active
    {
        do
        {
            poll_for_packet_arrival;
            if packet received
            {
                if octets_in_queues + straddling_octets = 0 /* Holdover timer is
kicked off by */
                        Holdover_Limit = time + Holdover;
                /* low priority traffic as well */
                    queue_packet;
            }
        } while ( (straddled_octets + octets_in_high_priority queue < 47 OR
```

-continued

```
time<
                maxof(TAT-Tmin, Limit_Tsus)) AND (time <
Holdover_Limit) AND
                (straddled_octets + octets_in_both_queues < 47 OR time < TAT-
Tsus) )
        assemble and dispatch CPS PDU;
            if (straddling_octets + octets_in_queues < > 0)
            HoldoverLimit = time + Holdover
            else
            HoldoverLimit = NOT_SET;
            TAT_Tmin = time + Tmin;
            if (time >= TAT_Tsus)
                TAT_Tsus = time + TAT_Tsus /* Sets Tsus outside of a burst */
            else
                TAT_Tsus = TAT_Tsus + Tsus; /*Sets Tsus within a burst */
            Limit_Tsus = TAT_Tsus - BT;
    } /* end repeat while
}
```

Figure 4:
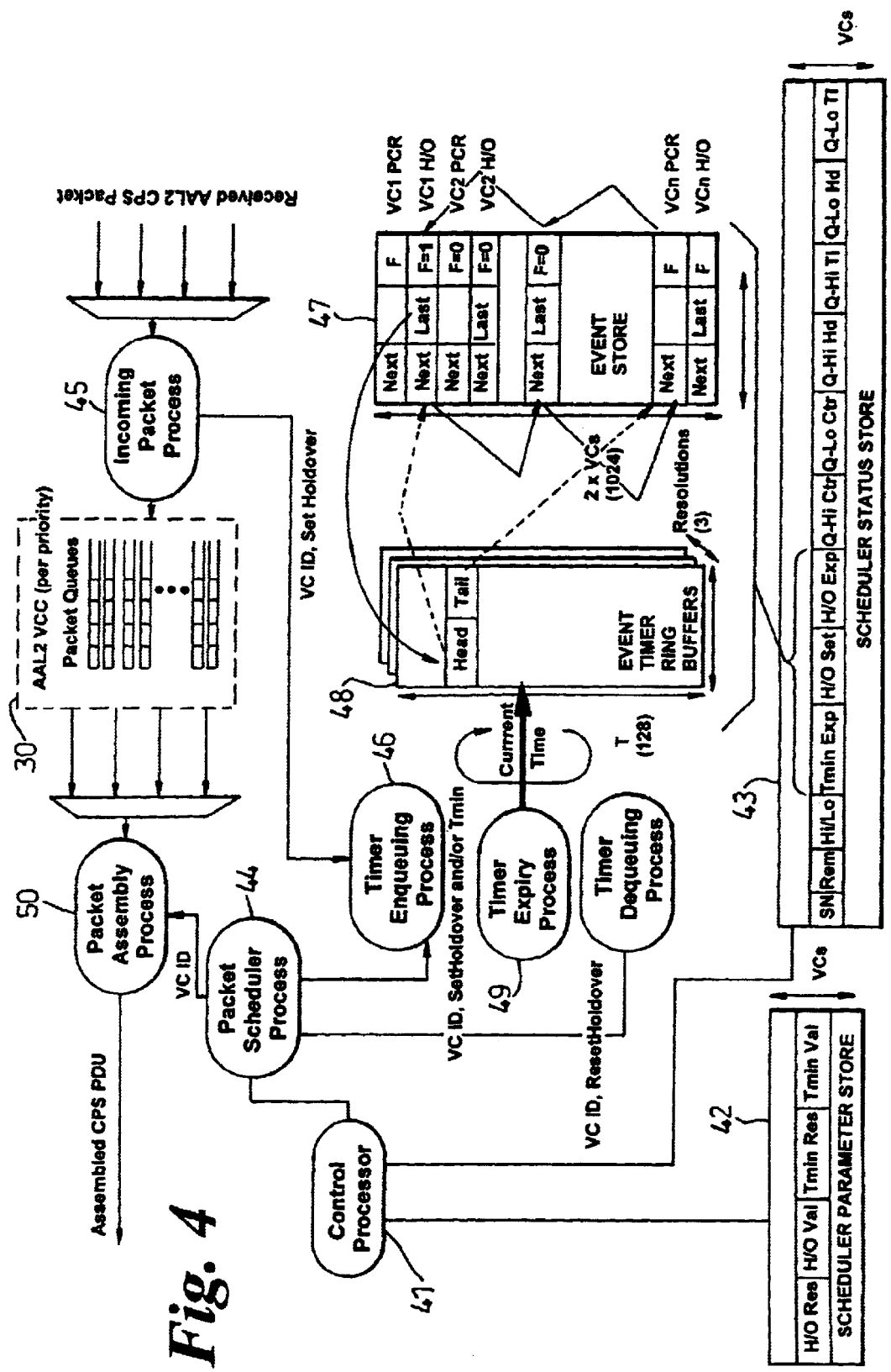
FIG. 4 is a schematic diagram of a scheduler embodying the algorithm of FIG. 2.
Figure 5:
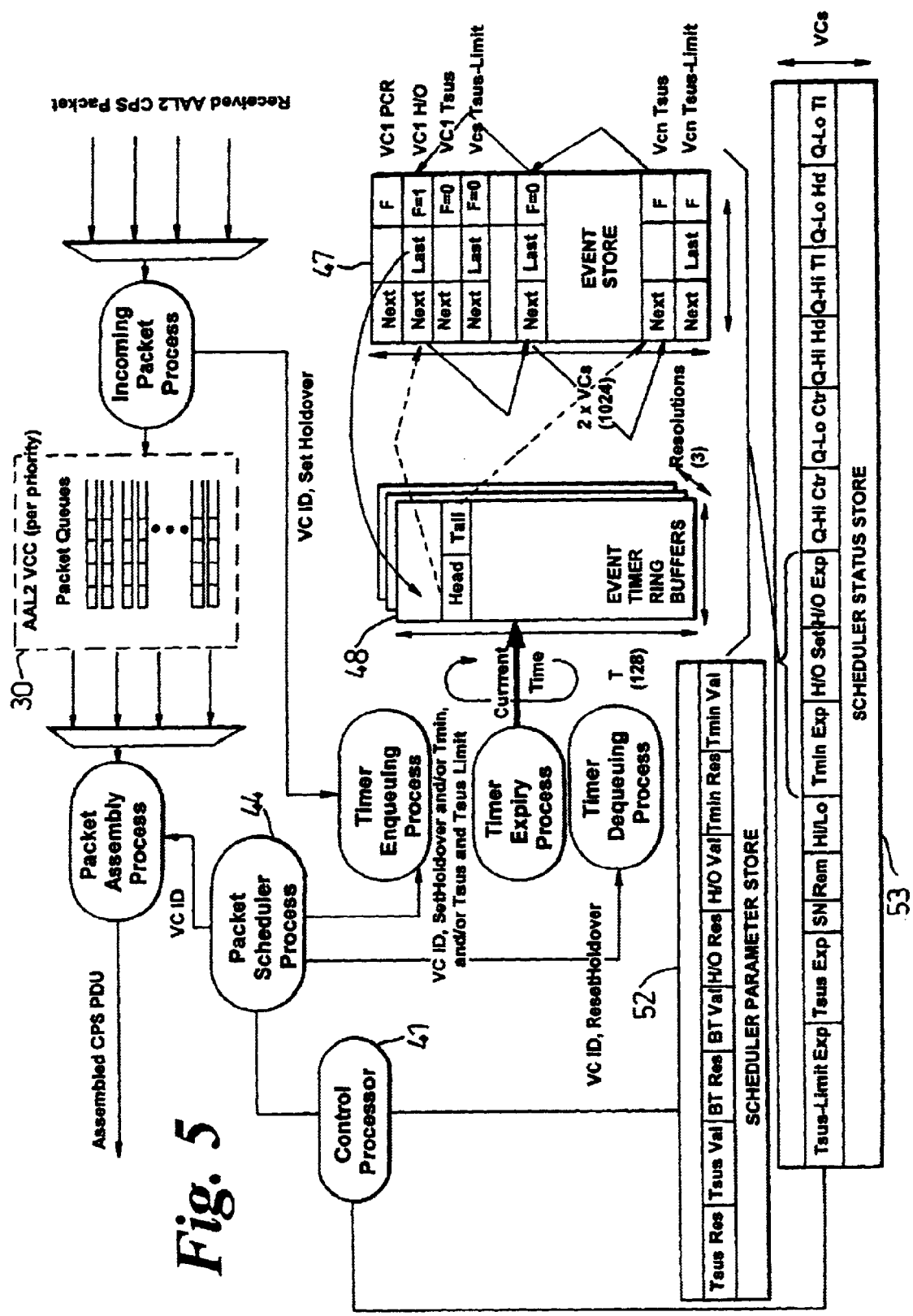
FIG. 5 is a schematic diagram of a scheduler embodying the modified algorithm of FIG. 3.

FIGS. 4 and 5 depict in schematic form packet schedulers embodying the AAL2 packet scheduler algorithms previously described. The embodiment described logically provides one instance of an AAL2 packet scheduler per AAL2 bearer VCC. In this embodiment two levels of packet priority are supported and each scheduler schedules ATM payloads up to a rate equal to the PCR (i.e. the minimum period between successive cells for a VCC is equal to Tmin). Thus the algorithm may be used to support either CBR VCCs or rt-VBR VCCs (in the latter case implicit conformance of the SCR and MBS parameters is assumed through the use of an appropriate CAC algorithm.

The scheduler embodiment to be described has the following general characteristics:

The traffic scheduler is capable of supporting multiple AAL2 VCCs. In this example 512 VCCs—but this is readily extended. Each AAL2 VCC is treated fairly with respect to the other AAL2 VCCS.

For each AAL2 VCC the user may configure the Tmin (1/PCR) and the Holdover values. If a null is programmed for the Tmin Value then the packet scheduler is free to emit payloads whenever they have been completed irrespective of the inter-cell duration. A null for the Holdover Value may also (or alternatively) be specified—this defines that the packet scheduler emits completed (full) ATM SDUs only, irrespective of the cell assembly delay.

Per AAL2 VCC, the scheduler will emit completed (assembled) ATM cell payloads at a maximum rate up to the pre-defined PCR of that bearer.

Per AAL2 VCC, holdover timers are implemented. In this embodiment Holdover values between approximately 100 us and 125 ms are supported (although this may be readily extended). To minimise the implementation requirements—the resolution of the holdover timer decreases as the holdover timer increases.

The packet scheduler supports two priorities—a separate queue (per priority) per AAL2 VCC is maintained. The number of priorities supported may be readily extended.

Strict sense priority is used to select between the two priority queues within a single AAL2 VCC packet scheduler. (i.e. the priority mechanism is only applied within a VCC and not across the aggregate range of the total set of VCCs—thus the fact that one VCC has a number of high priority packets awaiting scheduling would have no influence over the scheduling decision of another AAL2 VCC even though it might only contain low priority packets).

General Operation

The packet scheduler is controlled through the use of two timed events: the Holdover Timer Event and the Tmin Timer Event. Each timer event may be in one of three possible states: Not Set (no timer in operation), Set (with an associated expiry time) and Expired (a set time has come and gone). The operation of the scheduler follows the behaviour described below:

On initialisation of the AAL2 VCC the Holdover Timer Event is Not Set. The Tmin Timer Event is set to EXPIRED.

On detection of the first packet arrival for the VCC (either high or low priority with both queues empty) a new Holdover Timer Event is set (equal to the sum of the current time and the programmed Holdover Value parameter if not null). A null Holdover value does not set an event.

On detection of either of the following conditions, the AAL-2 packet scheduler schedules the emission of a CPS-PDU:

The Tmin Timer Event has Expired and the number of unscheduled octets in the VCC queue (aggregated over both the high and low priority queues) is greater than or equal to 47. (Note this includes both packet header and packet payload octets)

The Holdover Timer Event has Expired.

After scheduling a new CPS-PDU, if the Tmin Timer value is configured as null the Tmin Timer Event remains in the Expired state, otherwise it is set (equal to the sum of the current time and the Tmin Timer Value parameter). The Holdover Timer Event is also set (if not null) if there remain any further unscheduled octets within the VCC queues (either high or low priority)—if not then the Holdover Timer Event is set to Not Set until the detection of the next packet arrival for that VCC.

Upon detection of the necessary conditions in 3 above (and not prior to this) the scheduled ATM CPS PDU is assembled and dispatched. The CPS PDU is assembled in the following order:

Firstly, any unused octets from a packet (high or low priority) that straddles over from the previous ATM CPS-PDU are used (i.e. finish last unfinished packet from either queue).

Secondly, octets are used from the head of the (unscheduled) high priority queue until the payload is completed or the queue consumed.

Thirdly, octets are used from the head of the (unscheduled) low priority queue until the payload is completed or the queue consumed.

Finally any unused payload bytes will be filled with the AA2 padding byte.

Implementation Details

The detailed implementation of the packet scheduler process embodying the algorithm of FIG. 2 is now described. A block diagram of the implementation is shown in FIG. 4. The operation of the packet scheduler is distributed across a number of processes and controlled through the use of a number of common key stores.

The Control Processor 41 is used to configure and monitor the behaviour of the per AAL2 VCC. packet schedulers. Prior to initialisation of an AAL2 VCC, under user control, the Control Processor configures the parameters of the VCC by programming the relevant location within the Scheduler Parameter Store 42. The Scheduler Parameter Store 42 contains one location per VCC which maintains a list of the per VCC connection parameters that control the operation of the packet scheduler. Although normally setup upon VCC establishment they may also be modified during the lifetime of the VCC connection. The following fields are programmable per AAL2 VCC.

The Tmin Val (Tmin Timer Value) field specifies the duration of the Tmin timer.

The Tmin Res (Tmin Timer Resolution) field specifies the resolution of the Tmin Timer. The two fields are used together to fully specify the Tmin Timer—their use will be explained fully later.

The H/O Val (Holdover Value) field specifies the duration of the Holdover timer.

The H/O Res (Holdover Resolution) field specifies the resolution of Holdover Timer. The two fields are used together to fully specify the Holdover Timer—their use will be explained fully later.

Additionally to setup a new VCC the Control Processor 41 initialises the per VCC status parameters within the Scheduler Status Store 43. This store maintains the dynamic per AAL2 VCC status parameters that enable the control of the packet scheduling processes. This store provides the key interface for controlling the interaction between the various sub-processes. The following fields are maintained per VCC:

The Q-Hi Hd and Q-Hi Tl (High Priority Queue Head and Tail Pointers). Incoming packets are stored in the packet payload memory until they are scheduled. A common memory 30 is used to provide a shared storage area and the individual per VCC per priority queues are configured using linked list structures. The Q-Hi Hd and Q-Hi Tl are used to point to the head and tail locations of the high priority VCC queue. A null value indicates that there are no packets within that queue.

The Q-Lo Hd and Q-Lo Tl (Low Priority Queue Head and Tail Pointers). As above but for the low priority queue.

The Q-Hi Ctr (High Priority Queue Counter). This field maintains a count of the total number of octets in the high priority queue that have yet to be scheduled/assembled into a CPS-PDU. The count includes both payload and header octets and includes any straddled octets.

The Q-Lo Ctr (Low Priority Queue Counter). As above but for the low priority queue.

The H/O Set (Holdover Timer Set) flag is used to indicate whether a Holdover Timer value is currently defined for the AAL2 VCC.

The H/O Exp (Holdover Timer Expired) flag indicates that the Holdover Timer value has expired (timed-out).

The Tmin Exp (Tmin Timer Expired) flag indicates that the Tmin timer value has expired (timed-out).

The Rem (Remaining) field is used in the process of scheduling packets that straddle across at least one CPS-PDU boundary. In normal operation, this field is used to indicate (for the straddled packet) how many octets remain to be scheduled in the CPS-PDU currently under assembly. This value includes both payload and header bytes.

The Hi/Lo (High/Low) bit is used to indicate whether the straddled packet is queued on the high or low priority packet queues.

The SN (Sequence number) field is used to record the modulo-2 sequence number that is transmitted within the start field (STF) of an AAL2 CPS PDU. The fields is incremented every time a CPS-PDU is assembled by the scheduler.

At initialisation the control processor configures the status parameters to the following values: Q-Hi Hd=0 (NULL), Q-Hi Tl=0 (NULL), Q-Lo Hd=0 (NULL), Q-Lo Tl=0 (NULL), Q-Hi Ctr=0, Q-Lo Ctr=0; H/O Set=0 (Not SET), H/O Exp =0, Tmin Exp=1 (SET); Rem=0; Hi/Lo=0, SN=0.

Once initialised the AAL2 packets may be received (and subsequently scheduled) by the packet scheduler 44. Incoming packets are terminated by the Incoming Packet Process 45. For each received packet the Incoming Packet process determines the outgoing bearer VCC to which the packet is destined and the priority of the received packet. The outgoing VCC is determined by the a connection identifier for the packet whilst the priority is determined by a subset of the packet identifier, the packet type (as indicated by the UUI field within the AAL2 header), and a configurable dynamic call state for the connection. Optimally the packet queues are maintained using a shared dynamic buffer and therefore the incoming packet process uses a series of linked lists—one linked list per priority per bearer VCC. Thus as the incoming packet is received a free slot in the buffer is chosen (via a free list) and the appropriate linked list updated (including updating the necessary head and tail pointers within the Scheduler Status Store). Additionally, Q Hi-Ctr (or Q-Lo Ctr) is incremented by the length of the received packet. Finally, if prior to the receipt of this packet, both the Hi and Lo priority queues were empty for that VCC then a new Holdover Timer Event will be set (unless the Holdover Value is NULL). To set a Holdover Timer for the VCC the Incoming Packet Process raises a flag to the Timer En-Queuing Process 46 indicating both the identification of the VCC and the Event Type.

The timing of events is performed using a set of Event Timer ring buffers 48 in conjunction with an Event Store 47. Each location in an Event Timer ring buffer represents a single time period whilst each location in the Event Store represents a particular event, either the expiry of a Tmin Timer or the expiry of a Holdover Timer, determined by the timer expiry process 49. Therefore to set a new timed event it is simply necessary to associate the relevant Event Store location with the relevant Event Timer location. A doubly linked list mechanism is employed to achieve this. The Event Timer ring buffer maintains a set of head and tail pointers (one for each time period)—whilst all the events due to expire at that period are chained together in the Event Store. A doubly linked list is used as this enables events to be simply de-queued prior to their natural expiry—a requirement since for the majority of cases the CPS-PDU will be fully assembled before the Holdover timer expires. An F (first) bit field is associated with each Event Store location— if set this indicates that the Event is the first event within the chain and therefore that the Last field is pointing back to the Event Timer location—again this is necessary to be able to dequeue events at random within the list.

Since there are two events per VCC (Tmin Expiry and Holdover Expiry) the Event Store consists of 2×number of AAL2 VCCs. Each location explicitly represents one event (i.e location 1 represents VCC1 Tmin Timer expiry, location 2 represents VCC2 Holdover Timer expiry, location 3 represents VCC2 Tmin Timer expiry and so on).

Strictly it is only Holdover events that are de-queued prior to their natural expiry and therefore the storage requirements of the Event Store may be optimised by providing two Event Stores—one for Tmin expiry (which needs only to be singly linked) and one for Holdover expiry (that needs to be doubly linked as described).

The time period covered by an Event Timer is equal to the number of its memory locations multiplied by the timing resolution of that timer. To enable the process to support a wide timing range without recourse to an excessively large store, multiple Event Timers may be supported in parallel. Each Event Timer supports a differing timing resolution. For example three Event Timers containing 128 locations can be used to support a timing range between 0 and 128 ms in the following manner:

Event Timer 1: Resolution 10 μs—Range 0 to 1.28 ms
Event Timer 2: Resolution 100 μs—Range 0 to 12.8 ms
Event Timer 3: Resolution 1 ms—Range 0 to 128 ms Thus each Event is associated with the appropriate Timer according to its range and resolution.

Therefore to set the Holdover Timer, the Timer Enqueuing process 46 reads the appropriate location of the Scheduler parameter store 42 to determine its value (H/O Val) and resolution (H/O Res)-the current process time is added to the H/O Val to determine the location of this event within the Event Timer ring buffer whilst the H/O Res indicates which of the Event Timers to use. The new timer is then set by adding the event to the appropriate linked list and the H/O Set bit is Set within the Scheduler status store to indicate that a holdover timer is in operation for that VCC.

Working in parallel with the Timer Enqueuing Process is the Timer Expiry Process 49: This process controls the operation of the Event Timers/Event Stores. Each of the three Event Timer Stores operate in parallel (any contention between the three stores may be resolved by giving priority to the finer resolution timer). At each time interval the current time is incremented and thus increments the pointer to the next Event Timer location. At this time the process dequeues the associated linked-list—as each event is de-queued the process simply sets the relevant expiry bit in the Scheduler Status Store (e.g. if the timer dequeues a Holdover expiry event for VCC3 then it sets the H/O Exp flag in the scheduler status store for VCC3). Since the number of events that are queued for any time period can vary, then the time to perform the dequeuing process will also vary. Therefore there is an overall control process that is used to determine the correct time interval at which to advance to the next memory location. If for any memory location the dequeuing process takes longer than the time that that location actually represents then the sub-process continues to dequeue events (at that location and subsequent locations) at its maximum rate until the process catches up with 'real' time).

The Packet Scheduler Process 44 is used to constantly monitor the Scheduler Status store 43 in order to determine when it should schedule the assembly of a CPS-PDU. Its function is to detect the condition {H/O Exp=SET OR {Tmin Exp=SET AND,(Q Hi+Q Lo)>=47). Upon detection it triggers the CPS-PDU Assembly Sub-process to be described with the identity of the scheduled VCC. In addition the packet scheduler sub-process does the following tasks.

If necessary (i.e H/O Exp=0, H/O Val <> NULL) it triggers the Timer Dequeuing Process to dequeue an unexpired Holdover Timer.

If Tmin Val <>0 it will trigger the Timer Enqueueing Process to recalculate and re-queue the Tmin Timer and resets the Tmin Exp flag.

Further if after assembly of the just scheduled CPS-PDU, there are remaining unscheduled octets for that VCC (within either of the two queues) it will trigger (to the Timer Enqueuing Process) the queuing and recalculation of a new Holdover Timer (and reset the H/O Exp flag). If no unscheduled octets remain it simply resets the H/O Set flag.

Finally, the CPS-PDU Assembly Process 50 triggered by the packet scheduler process is used to assemble the CPS PDU for the scheduled VCC. The CPS PDU is assembled in the following order:

firstly use up any remaining octets from a straddled packet (the presence of a straddled packet, how many straddled octets remain and from which priority queue to take them from, is indicated by the Rem and Hi/Lo fields in the manner already described.

secondly octets are scheduled from the high priority queue until either the queue is exhausted of unscheduled octets or the CPS PDU is completed.

thirdly octets are scheduled from the low priority queue until either the queue is exhausted of unscheduled octets or the CPS PDU is completed.

finally padding bytes are used to complete any empty payload space

As the CPS-PDU Assembly Process assembles the CPS-PDU it dequeues any fully consumed packets (and adjusts the appropriate head pointer within the Scheduler Status store). In addition using the remaining and SN fields for the VCC it generates the STF, octet. Finally at the end of the assembly process the Q-Hi Ctr, Q-Lo Ctr, SN, Rem and H/L fields are recomputed.

An alternative exemplary scheduler construction is illustrated schematically in FIG. 5. In this example a full rt-VBR scheduler is implemented which explicitly schedules according to both the SCR and PCR elements of the traffic contract. The scheduler works as per the previous example with the following exceptions:

For each AAL2 VCC the user configures the following parameters: Tmin (1/PCR), TSus (1/SCR), BT (burst tolerance=[MBS−1]*[1/SCR−1/PCR]) and the Holdover values.

The following condition holds true: Tmin<Tsus<Holdover

Null values may be programmed for the:

Holdover Value: In which case the packet scheduler will emit only full ATM SDUs irrespective of the cell assembly delay.

A null TSus and (by implication BT) in which case the packet scheduler can emit packets indefinitely at the full PCR (i.e the VCC reverts to CBR behaviour).

A null PCR value in which case the packet scheduler may emit ATM SDUs as soon as sufficient data is present irrespective of the inter-cell duration. (Note the TSus are also set NULL in this case).

General Operation

The packet scheduler is now controlled through the use of four timed events. In addition to the Holdover Timer Event and the Tmin Timer Event two new Events are added—the Tsus Timer (which is used to time conformance to the actual SCR) and the Tsus-Limit Timer Event (which is used to determine the limit on the SCR—i.e. how much burst may be tolerated). Again each timer event may be in one of three possible states: Not Set (no timer in operation), Set (with an associated expiry time) and Expired (a set time has come and gone). The operation of the scheduler follows the behaviour described below:

On initialisation of the AAL2 VCC the Holdover Timer Event is Not Set. The Tmin Timer Event, Tsus Timer Event and Tsus-Limit Timer Event is set to EXPIRED.

On detection of the first packet arrival for the VCC (either high or low priority with both queues empty) a new Holdover Timer Event is set (equal to the sum of the current time and the programmed Holdover Value parameter if not null). A null Holdover value does not set an event.

On detection of either of the following conditions, the AAL-2 packet scheduler schedules the emission of a CPS-PDU:

The Tmin Timer Event and the Tsus-Limit Timer Event have both Expired and the number of unscheduled octets in the high priority VCC queue (plus any unscheduled octets in a straddling packet irrespective of priority) is greater than or equal to 47. (Note this includes both packet header and packet payload octets).

The Tsus Timer Event has Expired and the number of unscheduled octets in both the high and low priority VCC queues (plus any unscheduled octets in a straddling packet irrespective of priority) is greater than or equal to 47. (Note this includes both packet header and packet payload octets).

The Holdover Timer Event has Expired.

After scheduling a new CPS-PDU, if the Tmin Timer value is configured as null the Tmin Timer Event remains in the Expired state, otherwise it is set (equal to the sum of the current time and the Tmin Timer Value parameter). The Holdover Timer Event is also set (if not null) if there remain any further unscheduled octets within the VCC queues (either high or low priority)—if not then the Holdover Timer Event is set to Not Set until the detection of the next packet arrival for that VCC. If the Tsus Timer Value is configured as null then both the Tsus Timer Event and the Tsus-Limit Timer Event remain in the expired state. Otherwise the Tsus Timer is set to either the sum of the current time plus the Tsus Timer Value (if the Tsus timer has expired indicating that the just scheduled cell did not contribute to a burst) or to the sum of the currently set Tsus Timer Event plus the Tsus Timer Value (if the Tsus Timer Event has not yet expired i.e the previous scheduled cell has contributed to a burst). In either case the Tsus-Limit Timer-Event is then set to the sum of the newly set Tsus Timer Event minus the BT.

Upon detection of the necessary conditions in 3 above (and not prior to this) the scheduled ATM CPS PDU is assembled and dispatched. The CPS PDU is assembled (as in the previous algorithm in the following order):

Firstly, any unused octets from a packet (high or low priority) that straddles over from the previous ATM CPS-PDU are used (i.e. finish last unfinished packet from either queue).

Secondly, octets are used from the head of the (unscheduled) high priority queue until the payload is completed or the queue consumed.

Thirdly, octets are used from the head of the (unscheduled) low priority queue until the payload is completed or the queue consumed.

Finally any unused payload bytes will be filled with the AAL2 padding byte.

Implementation Details

The detailed implementation of the packet scheduler process embodying the algorithm of FIG. 3 is now described with reference to the block diagram of FIG. 5. The operation of the packet scheduler is substantially identical to that previously described with reference to FIG. 4, but with the following exceptions:

The Scheduler Parameter Store 52 contains the following additional per VCC fields.

The Tsus Val (Tsus Timer Value) field specifies the duration of the Tsus (SCR) timer.

The Tsus Res (Tsus Timer Resolution) field specifies the resolution of the Tsus Timer.

The BT Val (Burst Tolerance Value) field specifies the duration of the burst tolerance timer.

The BT Res (Burst Tolerance Resolution) field specifies the resolution of BT Timer.

The following per VCC status parameters are added to the Scheduler Status Store 53:

The Tsus Exp (Tsus Timer Expired) flag indicates that the Tsus Timer value has expired (timed-out).

The Tsus-Limit Exp (Tsus-Limit Exp Timer Expired) flag indicates that the Tsus-Limit (burst tolerance) timer value has expired (timed-out).

At initialisation the control processor configures the additional status parameters to the following values: Tsus Exp=1 (SET); Tsus-Limit Exp=1 (SET).

Once initialised the AAL2 packets may be received (and subsequently scheduled) by the packet scheduler.

The operation of the Incoming Packet Process is analogous to the previous description.

The timing of events is again performed using the combination of Event Timer ring buffers and the Event Store. The Event Store is however expanded to include two further per VCC Events (the expiry of the Tsus Timer and the expiry of the Tsus-Limit Timer). Since there are four events per VCC the event store now consists of 4×number of AAL2 VCCs.

The Holdover Timer and Tmin Timer events are established exactly as before. The Tsus and Tsus-Limit timers are always established in parallel. To set these values the Enqueueing Process firstly determines if the Tsus timer has expired or not. If it has not expired then it will dequeue the current timer value (either directly or in association with the Dequeuing process), temporarily recording its value to use in the subsequent computation) and set a new Tsus value equal to the previous Tsus Timer plus the Tsus Value. If it has already expired then it will set the new Tsus Timer to the sum of the current time plus the Tus Value. In either case it temporarily records this new value and uses it to set the new TSus-Limit timer equal to the Tsus Timer minus the BT Val. If the relevant parameters (BT, TSus) are configured using different resolutions then the Enqueuing process should convert to a common resolution, perform the calculation and determine the most appropriate Ring Buffer for its storage.

The Timer Expiry Process: works identically as before except it now dequeues and sets the appropriate expiry bit for four event types.

The Packet Scheduler Process now detects the following conditions in order to schedule an ATM SDU {H/O Exp= SET OR {Tmin Exp=SET AND Tsus-Limit=SET AND (Remaining+Q Hi*)>=47) OR {QHi+QLo>=47 AND Tsus= SET) Upon detection it triggers the CPS-PDU Assembly Sub-process to be described with the identity of the scheduled VCC. In addition the packet scheduler sub-process does the following tasks If necessary (i.e H/O Exp=0, H/O Val <> NULL) it triggers the Timer Dequeuing Process to dequeue an unexpired Holdover Timer.

If Tmin Val <>0 it will trigger the Timer Enqueuing Process to recalculate and requeue the Tmin Timer and resets the Tmin Exp flag.

If Tsus Val <>0 it will trigger the Timer Enqueuing Process to recalculate and requeue the Tsus Timer and Tsus-Limit Timer (and resets the Tsus Exp flag and Tsus_Limit_Exp flag}.

Further if after assembly of the just scheduled CPS-PDU, there are remaining unscheduled octets for that VCC (within either of the two queues) it will trigger (to the Timer Enqueuing Process) the re-queuing and recalculation of a new Holdover Timer (and reset the H/O·Exp flag). If no unscheduled octets remain it simply resets the H/O Set flag.

* Note in this case if Hi/Lo indicates that the Remaining Octets are from the high priority queue then Remaining is already included in the Q-Hi count and therefore not counted twice.

The CPS-PDU Assembly Process works as previously described.

Note that since both the Tmin and Tsus-Limit timers both expire before a packet may be scheduled it is possible to optimise these events into a single timer. To do this the packet enqueuing at each calculation point determine which of the two conditions generates the timer that expires last and use this to set a timed event.

It will be understood that the above description of a preferred embodiment is given by way of example only and that various modifications may be made by those skilled in the art without departing from the spirit and scope of the invention.

We claim:

1. A method of scheduling dispatch of packets containing constant bit rate (CBR) or real time variable bit rate (rt-VBR) at an ingress operation of multiplexing the packets into payloads of an asynchronous transfer mode (ATM) bearer virtual circuit connection, the method comprising;

enabling a holdover timer having a pre-set period on receipt of a packet;

assembling common part sublayer payload data unit (CPS-PDU) comprising any unused octets from a previous packet partially dispatched, and whole packets in order of priority;

whenever said timer period expires before a said common part sublayer payload data unit is completed, packing the payload of that data unit with null data; and controlling the packet dispatch so as to match the traffic characteristics of an underlying bearer channel.

2. A method as claimed in claim 1, wherein said packets are stored in respective queues according to two or more priority levels, and wherein packets are preferentially taken from that queue having the higher or highest priority level.

3. A method as claimed in claim 2, wherein a partially completed common part sublayer payload data unit containing packets from said higher or highest priority queue is completed with one or more packets from a lower priority queue.

4. A method as claimed in claim 3, wherein scheduling of completed cells is determined from a sustained cell rate and a peak cell rate for the virtual circuit connection.

5. A method as claimed in claim 4, wherein said packets are ATM Adaptation Layer Two (AAL2) packets.

6. A packet scheduler for dispatch of packets containing constant bit rate (CBR) or real time variable bit rate (rt-VBR) at an ingress operation of multiplexing the packets into payloads of an asynchronous transfer mode (ATM) bearer virtual circuit connection, the scheduler comprising;

a holdover timer having a pre-set period on receipt of a packet;

assembly means for assembling common part sublayer payload data unit (CPS-PDU) comprising any unused octets from a previous packet partially dispatched, and whole packets in order of priority and, whenever said timer period expires before a said common part sublayer payload data unit is completed, for packing the payload of that data unit with null data; and means for controlling the packet dispatch so as to match the traffic characteristics of an underlying bearer channel.

7. A packet scheduler as claimed in claim 6, wherein said packets are stored in respective queues according to two or more priority levels, and wherein packets are preferentially taken from that queue having the higher or highest priority level.

8. A packet scheduler as claimed in claim 7, and arranged to complete a partially completed common part sublayer payload data unit, containing packets from said higher or highest priority queue, with one or more packets from a lower priority queue.

9. A packet scheduler as claimed in claim 8, wherein scheduling of completed cells is determined from a sustained cell rate and a peak cell rate for the virtual circuit connection.

10. A packet scheduler as claimed in claim 9, wherein event timing is effected via event timer ring buffers and an event store by associating event data in an event store location with a corresponding location in an event timer ring buffer.

* * * * *